United States Patent [19]

Gunlock

[11] Patent Number: 4,809,913
[45] Date of Patent: Mar. 7, 1989

[54] LIQUID SEED APPLICATOR

[76] Inventor: Theodore Gunlock, 16142 Royal Oak Rd., Encino, Calif. 91436

[21] Appl. No.: 88,556

[22] Filed: Aug. 24, 1987

[51] Int. Cl.[4] .............................. B05B 7/26; B05B 1/30
[52] U.S. Cl. .................................... 239/317; 239/571; 239/582.1
[58] Field of Search ............... 239/310, 317, 318, 571, 239/582.1; 222/630

[56] References Cited
U.S. PATENT DOCUMENTS

| | | | |
|---|---|---|---|
| 881,749 | 2/1906 | Somers | 239/317 X |
| 1,848,708 | 3/1932 | Gatchet | 239/317 |
| 2,507,410 | 5/1950 | Kemp | 239/318 X |
| 2,601,672 | 6/1952 | Gatchet | 239/317 X |
| 2,849,208 | 8/1958 | Skipwith, Jr. | 239/318 X |
| 4,387,852 | 6/1983 | Mattson et al. | 222/630 X |

*Primary Examiner*—Andres Kashnikow
*Assistant Examiner*—Mary Beth O. Jones
*Attorney, Agent, or Firm*—Beehler, Pavitt, Siegemund, Jagger, Martella & Dawes

[57] ABSTRACT

For seeding plots of ground where the seed can be spread over the surface and thereafter cultivated into the soil, use is made of a container in the form of a jar to hold the seed and from which the seed can be ejected by a stream of water. In the device of the invention water serves a multiple purpose. A stream of water is projected through a valve into the jar. One portion of the stream, with the aid of an auxiliary pasage, is deflected into the mass of seed of make a slurry. At the same time another portion of the stream with the aid of a second passage travels across the slurry and emerges from an outlet nozzle drawing with it portions of the slurry with its complement of seed. Moistened seed and the accompanying mass of water is ejected and spread over the area to be planted.

7 Claims, 1 Drawing Sheet

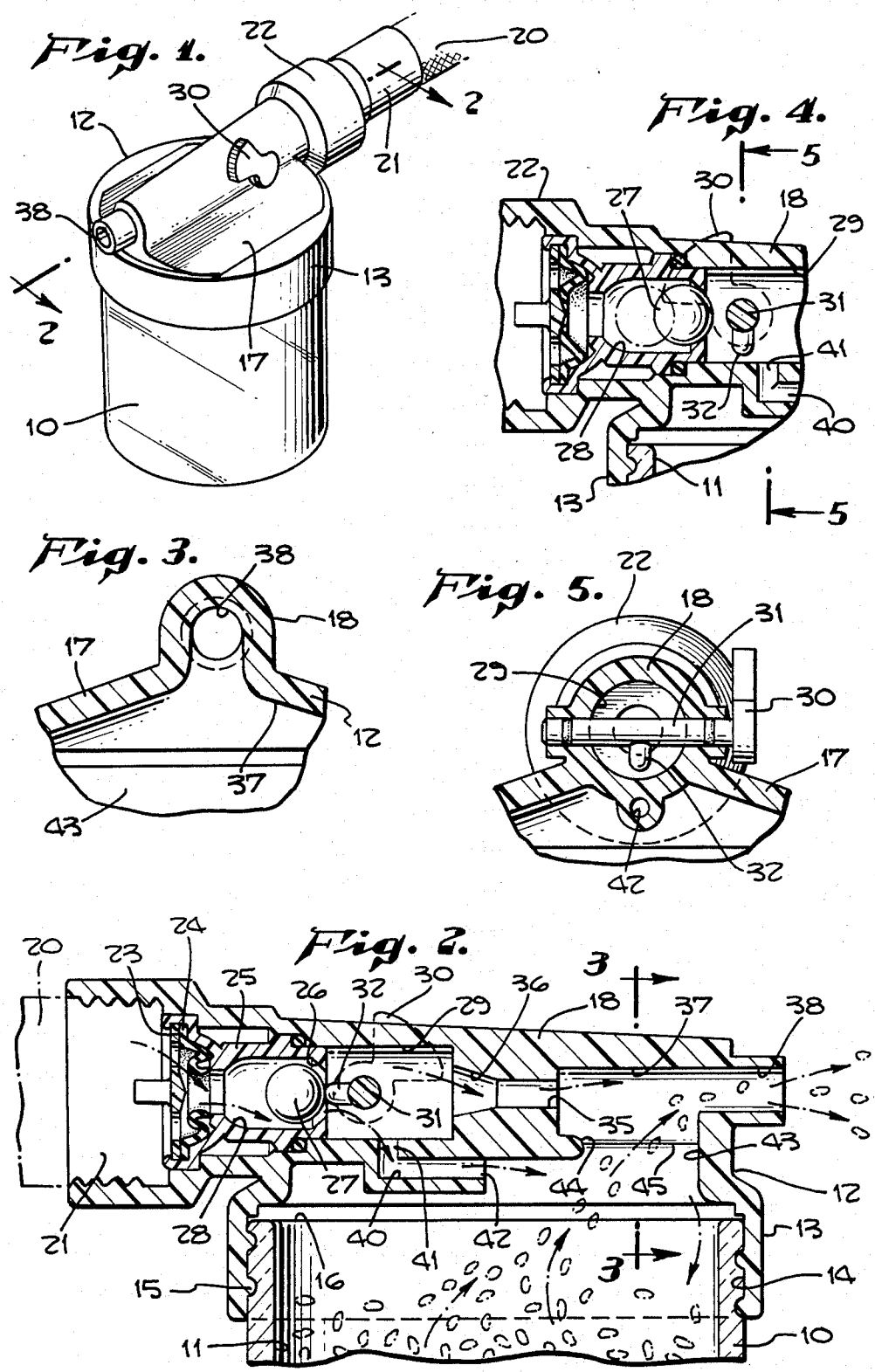

LIQUID SEED APPLICATOR

The liquid seed applicator comprising the subject matter of the disclosure is one applicable particularly to one type or another of grass seed which needs to be spread somewhat lightly over a prepared area where the grass is to grow. In throwing or casting seed for a planting operation of that kind, it is customary first to work the soil somewhat loosely for reception of the seed, throw the seed then as uniformly as desirable over the prepared surface, moisten the surface, and cultivate to a degree to work the seed into the soil. Clover, bent grass, blue grass and dichondra are often planted in such fashion. So also are grass seeds in the nature of fescues, rye, bermuda and mixtures. Comparable types of seed for other purposes are also contemplated as being accommodated.

Initially such seeding was actually hand thrown, then cultivated and watered. Manually handled tools in the nature of trowels and scoops have been used on occasions. More recently, another identified as a "cyclone" seeder has found favor to a degree. There has also been available a dry seed spreader mechanically manipulated with a crank and so constructed that a wheel or comparable manually actuated spreader is depended on to physically toss the seeds outwardly in a fan-like pattern, after which the seed is watered on the ground.

Those methods used in the past have had some advantages and have also experienced disadvantages. The spreading, for example, has tended to be somewhat uneven because of the limits of hand manipulation. Although the unevenness on occasion can be cured, extra effort is required. Subsequent application of water is accompanied by additional disadvantages in that the seed may be washed from an initially acceptable spread condition with an excess of water or, on occasions, insufficiently watered. Simultaneous infusion of fertilizers is also faced with limitations in prior art practice.

It is therefore among the objects of the invention to provide a new and improved liquid actuated seed applicator wherein the seed is pre-moistened and, at the same time, ejected from the seed application by a stream of water.

Another object of the invention is to provide a new and improved liquid seed applicator which makes use of conventional water pressure such as might be available from a garden hose, water under such pressure being partly diverted to create a slurry of water and seed and, by use of a portion of the same water supply, eject the slurry in a desired pattern to spread it on the ground.

Still another object of the invention is to provide a new and improved liquid pressure operated seed applicator capable of generating a slurry of water and seed prior to spreading it over the ground and of a character enabling employment of fluid fertilizer mixed with the slurry and spread at the same time.

Further among the objects of the invention is to provide a new and improved liquid pressure actuated seed applicator capable of simultaneously moistening the seed to be thrown, while at the same time maintaining a careful control over emission of the slurry in a desired pattern by valve action so that it can be started and halted at will.

With these and other objects in view, the invention consists of the construction, arrangements, and combination of the various parts of the device serving as an example only of one or more embodiments of the invention, whereby the objects contemplated are attained, as hereinafter disclosed in the specification and drawings and pointed out in the appended claims.

In the drawings:

FIG. 1 is an isometric view of the liquid seed applicator shown attached at the end of a hose.

FIG. 2 is an enlarged longitudinal sectional view taken on the line 2—2 of FIG. 1.

FIG. 3 is a fragmentary elevational view on the line 3—3 of FIG. 2.

FIG. 4 is a fragmentary elevational view of the left-hand portion of FIG. 2, showing different positions of the valve.

FIG. 5 is a cross-sectional view on the line 5—5 of of FIG. 4.

In an embodiment of the invention chosen for the purpose of illustration, a jar or cannister 10 of a size capable of being carried by hand is made use of, one having a reservoir 11 of one or two quarts being found acceptable. The capacity of the reservoir is, however, largely a matter of convenience in that the principle of structure and operation is as readily applicable to commercial sizes as well as those applicable to home gardening. A cover 12 has a rim 13 with interior threads 14 capable of being attached by means of exterior threads 15 at the upper rim of the cannister which provides a wide opening 16. In the chosen embodiment the cover has a relatively flat exposed area 17 across the center of which is a transversely disposed enlargement 18.

Extending into and through the cover 12, and preferably accommodated by the enlargement 18, is an operating combination of chambers and passages. These are intended to be supplied by a stream of water provided by a hose 20, for example. A male fitting 21 of the hose connects with a female fitting 22, forming one end of the enlargement 18. At the interior of the female fitting 22 where it merges with the assembly of passages, some conventional safeguard may be employed as, for example, a strainer 23, in company with a washer 24. The parts just made reference to are shown as being carried by a tubular member 25. The tubular member supports a check valve seat 26 which accommodates a ball check valve element 27. Water supplied by the hose 20 is directed into a valve chamber 28 from which it passes into an inlet chamber 29.

Normally, the ball check valve element 27 is adapted to be seated on the check valve seat 26 when water is supplied under pressure to the device. In order to admit water to the device, there is provided a handle 30, from which a rod 31 extends through the inlet chamber 29 so that, when the handle is rotated, an eccentric projection 32 on the rod 31 is adapted to engage the ball check valve element and unseat it, FIG. 2.

Directly opposite the check valve seat 26 is a direct passage 35 fed by an approach passage 36 from the inlet chamber 29. The direct passage 35 opens into a mixing chamber 37 which communicates with a nozzle 38.

There is a second smaller passage 40 with an inlet 41 intermediate opposite ends of the inlet chamber 29. The smaller passage 40 is directed transversely with respect to the reservoir 11 and its contents, an outlet end 42 of the passage 40 being more or less half-way across the top of the reservoir. Directly opposite the outlet end, the cover provides a wall 43 against which water from the outlet end can impinge. The wall 43 in cooperation with a bead 44 forms in effect still another communicating passage 45 between the reservoir 11 and the mixing chamber 37.

In operation the reservoir 11 is normally filled to capacity with dry seed, usually one form or another of grass seed, after which the cover 12 with its threaded connection is attached to the cannister 10 and the hose 20 fastened to the fitting 22. For this the valve handle 30 will be in the shutoff position, FIG. 4. When water flows through the hose under pressure, the valve element 27 will seat and no water will flow into the system.

When the liquid seeding operation is to be put in action, the handle is moved from the position of FIG. 4 to the position of FIG. 2 in order to unseat the ball check valve element 27. As a consequence, water flows into the inlet chamber 29 and from there is divided to provide flow through two separate passages. A greater quantity of the water flows through the direct passage 35 simultaneously with flow of a lesser quantity of water through the smaller passage 40. Water from the smaller passage 40 impinges upon the wall 43, a substantial part of it initially being diverted into the reservoir 11 to saturate the mass of seed which produces what may be described as a mass of slurry, substantially filling the reservoir 11.

As water continues to flow, some water from the smaller passage 40 will be diverted upwardly through the communicating passage 45. At the same time action of water projected from the direct passage 35 will draw the slurry into the mixing chamber 37 and therein mix the slurry with the added water and ultimately propel the mixture outwardly through the nozzle 38. The amount of slurry, and consequently the amount of grass seed 50 emerging from the nozzle 38, can be readily controlled by manipulation of the handle and, it need be on occasions, by water pressure in the hose 20. Clearly, by having the seed in the mass of slurry already wet, and adding to the moisture content by direct flow of water through the mixing chamber 37, a thoroughly moistened mass of seed can be directed to spots of cultivated ground where seeding is to be applied and the quantity of seeding thereby controlled. Should be wider spread of application be desirable, the form of the nozzle 38 can be changed to a flatter form or, should it be desired, a conventional attachment can be used to provide a flatter type nozzle.

An additional advantage of the arrangement of passages described is one wherein clogging is avoided. Clogging could occur in the area of the communicating passage 45. Non-clogging is accomplished by virtue of the stirring effect of liquid emerging from the smaller passage 40. Certain types of seed floating to the surface of the reservoir 11 could otherwise on occasion clog the output from the nozzle 38.

Normally the applicator is operated in the upright position of FIG. 1. On some occasions as, for example, should water pressure be insufficient or the cannister 10 be deeper than usual, as much as about five percent of the seed may remain. The arrangement of passages is one which enables the remaining contents to be ejected by merely turning the cannister upside down and the valve handle moved to unseat the ball check valve element while in the inverted position.

While a particular embodiment of the present invention has been shown and described, it will be obvious to those skilled in the art that changes and modifications may be made without departing from the invention in its broader aspects and, therefore, the aims of its appended claims are to cover all such changes and modifications as fall within the true spirit and scope of this invention.

Having described the invention, what is claimed as new in support of Letters Patent is as follows:

1. A liquid seed applicator comprising a container incorporating a reservoir with an opening at the top for accumulation of seed and liquid in the form of a slurry, a cover and a releasable attachment between the cover and the container, said cover having an inlet for reception of liquid, an outlet for discharge of a mixture of liquid and seed and passage means having an interconnecting relationship with the inlet, the reservoir and the outlet, said passage means comprising an inlet chamber in communication with said inlet, a mixing chamber in communication with said inlet chamber, a first passage intermediate said inlet chamber and said mixing chamber, a second passage between said inlet chamber and said reservoir, and a third passage between said reservoir and said mixing chamber, said third passage having a flow capacity substantially greater than the second passage, said third passage being adapted to release slurry from the reservoir of said mixing chamber and to the outlet for mixing with liquid from the first passage during travel of a combination of liquid and slurry to said mixing chamber and discharge from said outlet.

2. A liquid seed applicator comprising a container incorporating a reservoir with an opening at the top for accumulation of seed and liquid in the form of a slurry, a cover and a releasable attachment between the cover and the container, said cover having an inlet for reception of liquid, an outlet for discharge of a mixture of liquid and seed and passage means having an interconnecting relationship with the inlet, the reservoir and the outlet, said passage means comprising an inlet chamber in communication with said inlet, a mixing chamber in communication with said inlet chamber, a first passage intermediate said inlet chamber and said mixing chamber, a second passage between said inlet chamber and said reservoir, and a third passage between said reservoir and said mixing chamber, said third passage being adapted to release slurry from the reservoir to said mixing chamber and to the outlet for mixing with liquid from the first passage during travel of a combination of liquid and slurry to said mixing chamber and discharge from said outlet, said second passage being at a location exterior with respect to the reservoir and having an outlet end oriented in a direction transverse with respect to said third passage.

3. A liquid seed applicator comprising a container incorporating a reservoir with an opening at the top of the accumulation of seed and liquid in the form of a slurry, a cover and a releasable attachment between the cover and the container, said cover having an inlet for reception of liquid, an outlet for discharge of a mixture of liquid and seed and passage means having an interconnecting relationship with the inlet, the reservoir and the outlet, said passage means comprising an inlet chamber in communication with said inlet, a mixing chamber in communication with said inlet chamber, a first passage intermediate said inlet chamber and said mixing chamber, a second passage between said inlet chamber and said reservoir, and a third passage between reservoir and said mixing chamber, said third passage being adapted to release slurry from the reservoir to said mixing chamber and to the outlet for mixing with liquid from the first passage during passage of a combination of liquid and slurry to said mixing chamber and discharge from said outlet, said third passage having a wall transverse to the path of travel from said second passage for deflecting at least some of the liquid from the second passage toward said reservoir.

4. A liquid seed applicator comprising a container incorporating a reservoir with an opening at the top for accumulation of seed and liquid in the form of a slurry, a cover and a releasable attachment between the cover and the container, said cover having an inlet for reception of liquid, an outlet for discharge of a mixture of liquid and seed and passage means having an interconnecting relationship with the inlet, the reservoir and the outlet, said passage means comprising an inlet chamber in communication with said inlet, a mixing chamber in communication with said inlet chamber, a first passage intermediate said inlet chamber and said mixing chamber, a second passage between said inlet chamber and said reservoir, and a third passage between said reservoir and said mixing chamber, said third passage being adapted to release slurry from the reservoir to said mixing chamber and to the outlet for mixing with liquid from the first passage during travel of a combination of liquid and slurry to said mixing chamber and discharge from said outlet, the cross-sectional area of the first passage being in excess of the cross-sectional area of the second passage and the cross-sectional area of the third passage being in excess of the combined cross-sectional areas of said first passage and said second passage.

5. A liquid seed applicator as in claim 4 wherein a path of travel of liquid in said first passage is in alignment with said outlet, a path of travel of liquid in said second passage is transverse with respect to the third passage and the path of travel of liquid in the third passage is transverse with respect to the path of travel of liquid from said first passage.

6. A liquid seed applicator comprising a container incorporating a reservoir with an opening at the top for accumulation of seed and liquid in the form of a slurry, a cover and a releasable attachment between the cover and the container, said cover having an inlet for reception of liquid, an outlet for discharge of a mixture of liquid and seed and passage means having an interconnecting relationship with the inlet, the reservoir and the outlet, said passage means comprising an inlet chamber in communication with said inlet, a mixing chamber in communication with said inlet chamber, a first passage intermediate said inlet chamber and said mixing chamber, a second passage between said inlet chamber and said reservoir, and a third passage between said reservoir and said mixing chamber, said third passage being adapted to release slurry from the reservoir to said mixing chamber and to the outlet for mixing with the liquid from the first passage during travel of a combination of liquid and slurry to said mixing chamber and discharge from said outlet, the longitudinal axes of said first passage, said outlet and said second passage being in parallel relationship.

7. A liquid seed applicator as in claim 6 wherein said inlet chamber has a longitudinal axis in parallel relationship with the axis of said second passage and said outlet.

* * * * *